(12) United States Patent
Griffiths

(10) Patent No.: US 7,329,293 B2
(45) Date of Patent: Feb. 12, 2008

(54) DISPOSABLE FILTRATION SYSTEM FOR BAGLESS VACUUM CLEANERS

(76) Inventor: Bonnie-Lou Griffiths, 109 Dockerel Rd., Tolland, CT (US) 06084

(*) Notice: Subject to any disclaimer, the term of this patent is extended or adjusted under 35 U.S.C. 154(b) by 108 days.

(21) Appl. No.: 10/883,096

(22) Filed: Jul. 1, 2004

(65) Prior Publication Data

US 2005/0066638 A1   Mar. 31, 2005

Related U.S. Application Data

(60) Provisional application No. 60/506,398, filed on Sep. 27, 2003.

(51) Int. Cl.
A47L 9/20 (2006.01)

(52) U.S. Cl. ............... 55/300; 55/305; 55/485; 55/486; 55/492; 55/510; 55/DIG. 2; 55/DIG. 3; 15/347; 15/352

(58) Field of Classification Search ......... 55/300, 55/305, DIG. 3, 485, 486, 492, 510, DIG. 2; 15/347, 352, 353
See application file for complete search history.

(56) References Cited

U.S. PATENT DOCUMENTS

| | | | |
|---|---|---|---|
| 6,314,610 B1 * | 11/2001 | Miller et al. ............... | 15/347 |
| 6,440,191 B1 * | 8/2002 | Berfield et al. ............... | 55/485 |
| 6,596,044 B1 * | 7/2003 | Bilek et al. ............... | 55/337 |
| 6,598,263 B2 * | 7/2003 | Boles et al. ............... | 15/352 |
| 6,615,444 B2 * | 9/2003 | McGilll et al. ............... | 15/352 |
| 6,792,647 B2 * | 9/2004 | Park et al. ............... | 15/351 |
| 6,818,032 B2 * | 11/2004 | Bilek et al. ............... | 55/337 |
| 6,840,972 B1 * | 1/2005 | Kim ............... | 55/337 |
| 6,875,255 B2 * | 4/2005 | Alford et al. ............... | 95/273 |
| 7,041,146 B2 * | 5/2006 | Bugli et al. ............... | 55/481 |
| 2005/0132681 A1 * | 6/2005 | Chu ............... | 55/471 |
| 2006/0000195 A1 * | 1/2006 | Lim et al. ............... | 55/337 |
| 2006/0272299 A1 * | 12/2006 | Choi ............... | 55/337 |
| 2006/0278087 A1 * | 12/2006 | Sepke et al. ............... | 96/223 |

* cited by examiner

*Primary Examiner*—Duane Smith
*Assistant Examiner*—Minh-Chau T. Pham
(74) *Attorney, Agent, or Firm*—McCormick, Paulding & Huber LLP

(57) ABSTRACT

According to the present invention, a bagless vacuum cleaner includes a dust chamber, a primary filter and a second filter. The dust chamber includes an entrance and an exit. The primary filter is disposed in the dust chamber between the entrance and the exit and the second filter is disposed between the entrance and the primary filter. The second filter removes at least some contaminants from the air passing through the entrance. A user can selectively replace the second filter with a new second filter.

31 Claims, 3 Drawing Sheets

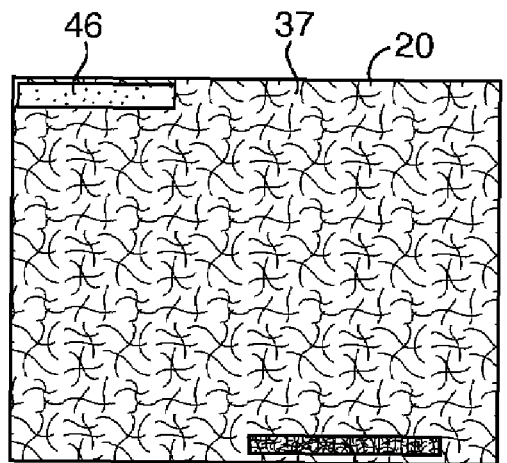
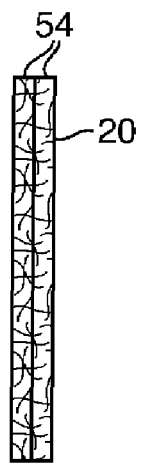
FIG. 4    FIG. 4A
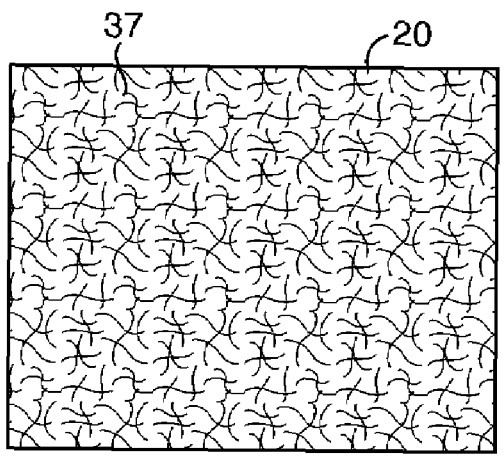
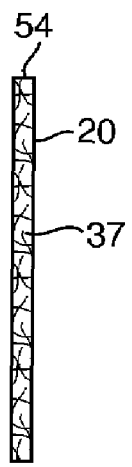
FIG. 5    FIG. 5A

DISPOSABLE FILTRATION SYSTEM FOR BAGLESS VACUUM CLEANERS

CROSS REFERENCE TO RELATED APPLICATIONS

This application claims priority to U.S. Provisional Patent Application No. 60/506,398 filed on Sep. 27, 2003 and titled "Disposable Secondary Filtration Sheets, With Optional Fragrance, For Bagless Vacuum Cleaners". The disclosure of the provisional application is incorporated in its entirety herein by reference.

BACKGROUND OF THE INVENTION

1. Field of the Invention

The present invention relates to a bagless vacuum cleaner in general and, more particularly, to a filtration system therefor.

2. Background Information

Traditionally, vacuum cleaners included a disposable bag. During operation of the vacuum, dirt, dust, debris and other contaminants are sucked up out of the surface below the vacuum. Once in the vacuum, the dust-filled air is directed into the disposable bag. The disposable bag, in turn, filtered the contaminants out of the air and permitted the now dust-free air to exit the bag. Once full of collected contaminants, the disposable bag is replaced with a new, empty disposable bag. However, vacuum cleaners utilizing disposable bags have several disadvantages. For example, because disposable bags are opaque, it is often difficult to ascertain whether the disposable bag is full. In addition, replacement bags must be purchased on a regular basis which can be expensive.

Accordingly, bagless vacuum cleaners have been developed. The bagless vacuum cleaners work in a manner similar to vacuums that include a disposable bag. Contaminant-filled air is sucked through the vacuum cleaner and directed into a dust chamber. The dust chamber includes an entrance, an exit, a filter, and a storage area. The filter is positioned between the entrance and the exit of the dust chamber. As dust-filled air is sucked in by the vacuum cleaner, the air passes through the entrance and then through the filter. The filter is intended to remove the contaminants from the air and permit substantially contaminant-free air to pass through to the exit of the dust chamber. In addition, in many cases the filter is designed to remove specific contaminants from the air, such as those contaminants that commonly trigger allergies. For example, HEPA® filters are designed to retain even microscopic particles. The contaminants removed from the air remain in the storage area of the dust chamber. Typically, the dust chamber is clear so that a user can easily ascertain when the storage area of the dust chamber is full and in need of emptying. In addition, the storage area only needs to be emptied when full, rather than completely replaced.

However, bagless vacuums also have disadvantages. For example, as contaminant-filled air is forced through the filter in the dust chamber, various pieces of debris often becomes stuck to the filter. Debris lodged in the filter can negatively affect the operation of the vacuum; therefore, the dust must be periodically cleared from the surface of the filter. While the dust and other debris can be physically removed by, for example, wiping the filter, effective cleaning of the filter requires the user to thoroughly wash the filter. Washing the filter is an undesirable task that is often messy. Additionally, once the filter is washed, it may require several days for the filter to dry, thereby rendering the vacuum cleaner unusable for a period of time.

Therefore, it is desirable to provide a filter for a bagless vacuum that will overcome the known shortcomings in the art.

SUMMARY OF THE DISCLOSURE

According to the present invention, a bagless vacuum includes a dust chamber having an entrance, an exit, a primary filter and a second filter. The primary filter is disposed in the dust chamber such that substantially all air passing through the entrance passes through the primary filter prior to passing through the exit of the dust chamber. The second filter is disposed in the dust chamber between the entrance and the primary filter such that substantially all air passing through the entrance passes through the second filter prior to passing through the primary filter. The second filter prevents at least some contaminants in the air passing through the entrance from coming into contact with the primary filter.

An advantage of the present invention is that the second filter substantially prevents dust and debris from lodging in the primary filter.

Another advantage of the present invention is that a user may selectively replace the second filter without the need for the time-consuming process of washing the primary filter.

A further advantage of the present invention is that it is relatively inexpensive to replace the second filter.

These and other objects, features, and advantages of the present invention will become apparent in light of the drawings and detailed description of the present invention provided below.

DESCRIPTION OF THE DRAWINGS

FIG. 4 is front view of one embodiment of a second filter of the bagless vacuum cleaner of FIG. 1;

FIG. 4A is a side view of the second filter of FIG. 4;

FIG. 5 is front view of another embodiment of a second filter of the bagless vacuum cleaner of FIG. 1; and FIG. 5A is a side view of the second filter of FIG. 5.

DETAILED DESCRIPTION OF THE INVENTION

Figure 1:
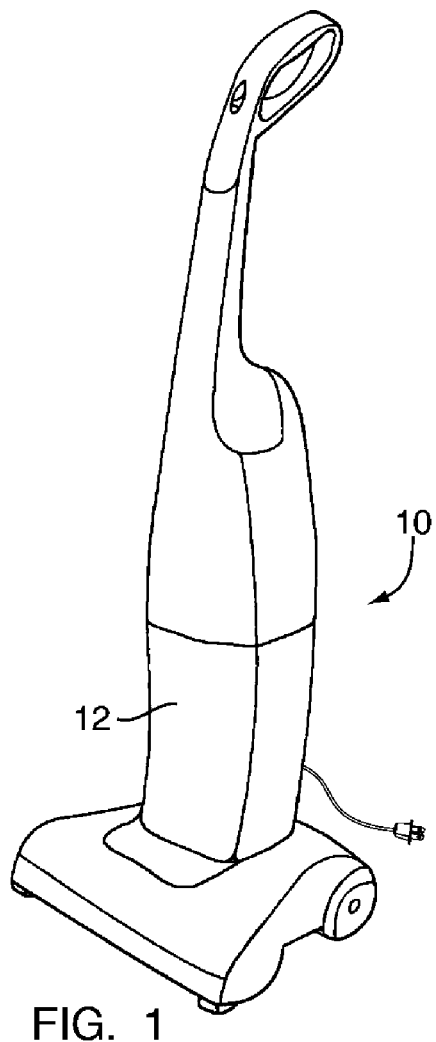
FIG. 1 is a schematic, perspective view of a vacuum cleaner.
Figure 2:
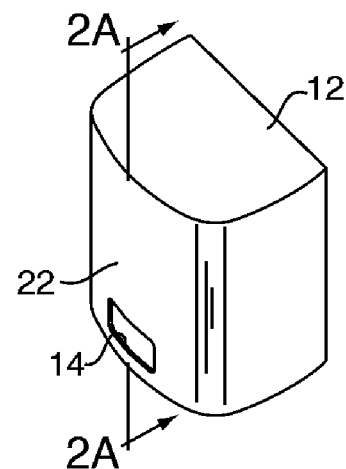
FIG. 2 is a schematic, perspective view of one embodiment of a dust chamber of the vacuum cleaner of FIG. 1.
Figure 2A:
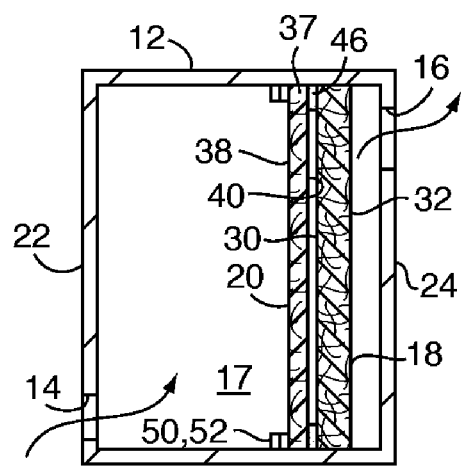
FIG. 2A is sectional view of the dust chamber of FIG. 2 along line 2A-2A with arrows generally indicating the passage by which air passes through the dust chamber.

Referring to FIGS. 1, 2 and 2A, a bagless vacuum cleaner of the present invention is generally indicated by the numeral 10. The bagless vacuum cleaner 10 includes a dust chamber 12 that has an entrance 14, an exit 16, a contaminant storage area 17, a primary filter 18 and a second filter 20. As shown in FIG. 2A, the primary filter 18 is disposed in the dust chamber 12 between the entrance 14 and the exit 16. The second filter 20 is disposed in the dust chamber 12 between the entrance 14 and the primary filter 18.

Figure 3:
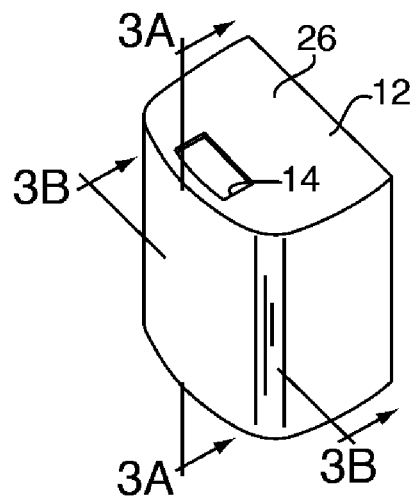
FIG. 3 is a schematic, perspective view of another embodiment of a dust chamber of the vacuum cleaner of FIG. 1.
Figure 3A:
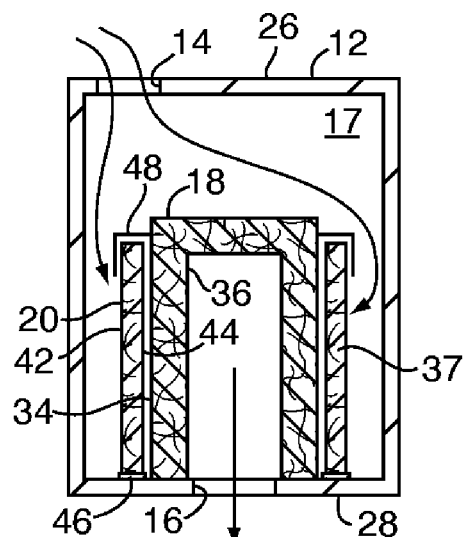
FIG. 3A is sectional view of the dust chamber of FIG. 3 along line 3A-3A with arrows generally indicating the passage by which air passes through the dust chamber.

Referring to FIGS. 2, 2A, 3, 3A and 3B, the dust chamber 12 may be of any suitable shape and/or configuration. Two (2) common commercially available configurations of dust chambers 12 are shown in, for example, FIGS. 2A and 3A. As shown in FIG. 2A, the entrance 14 to the dust chamber 12 can be located on one side 22 of the dust chamber 12 and the exit 16 to the dust chamber 12 can be located on a second side 24 of the dust chamber 12. Alternatively, the entrance 14, in some embodiments, may be located on one side 26 of the dust chamber 12 and the exit 16 centrally located on a second side 28 of the dust chamber 12, as shown in FIG. 3A. In each embodiment, the entrance 14 and the exit 16 may be of any suitable shape and/or size, depending on, for example, the amount of air flow that is desired. Between the entrance 14 and the exit 16, each dust chamber 12 also includes the storage area 17 for retaining contaminants that are removed from the air entering the dust chamber 12 by the filters 18,20.

Figure 3B:
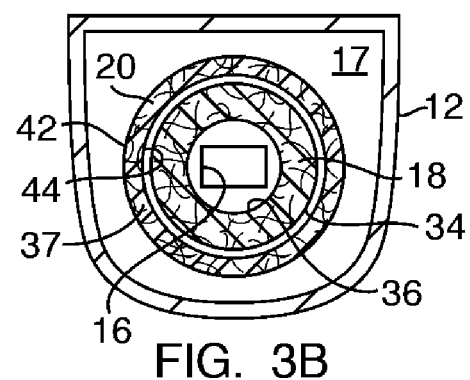
FIG. 3B is sectional view of the dust chamber of FIG. 3 along line 3B-3B with arrows generally indicating the passage by which air passes through the dust chamber.

Referring to FIGS. 2A, 3A and 3B, the primary filter 18 is disposed within the dust chamber 14 such that substantially all air entering through the entrance 14 passes through the primary filter 18 prior to passing through the exit 16 of the dust chamber 12. The primary filter 18 is typically designed to remove even microscopic contaminants from the air. Therefore, the primary filter 18 is typically sized and shaped based on the configuration of the dust chamber 12 in which it is disposed. For example, in the embodiment that is shown in FIG. 2A, the primary filter 18 is substantially flat. In these embodiments, the contaminated air passes through one side 30 of the primary filter 18 and exits through a second side 32 of the primary filter 18 before passing through the exit 16 of the dust chamber 12. Alternatively, and as shown in FIGS. 3A and 3B, the primary filter 18 is designed such that it is generally cylindrical in shape. In these embodiments, the contaminated air enters through an outer surface 34 of the primary filter 18 and exits through an interior surface 36 prior to passing through the exit 16 of the dust chamber 12.

The second filter 20 includes a second filter body 37 and is disposed in the dust chamber 12 substantially adjacent to and substantially covering the primary filter 18. Therefore, substantially all air passing through the entrance 14 passes through the second filter 20 prior to passing through the primary filter 18. Accordingly, the second filter 20 is generally shaped and sized based on the configuration of the primary filter 18 that is also in the dust chamber 12. For example, as shown in FIG. 2A, the second filter 20 is substantially flat in order to cover the primary filter 18. In these embodiments, the air passing through the entrance is drawn through a first side 38 of the body 37 of the second filter 20 and exits through a second side 40 of the second filter 20 prior to passing through the primary filter 18. Alternatively, and as shown in FIGS. 3A and 3B, the second filter 20 includes a second filter body 37 that may be generally cylindrical in shape when disposed in the dust chamber 12. In these embodiments, the contaminated air enters through an outer surface 42 of the body 37 of the second filter 20 and exits through an interior surface 44 before passing through the primary filter 18 also disposed in the dust chamber 12. The second filter 20 retains at least some of the contaminants from the air passing through the entrance 14 of the dust chamber 12 prior to the contaminants reaching the primary filter 12.

Continuing to refer to FIGS. 2A, 3A and 4, the vacuum cleaner 10 includes means for securing the second filter 20 within the dust chamber 12. The means for securing may be disposed on the primary filter 18, the second filter 20 and/or the dust chamber 12. In each embodiment, the second filter 20 is removably attached to either the primary filter 18 and/or the dust chamber 12. For example, in some embodiments, the second filter 20 may include an adhesive strip 46 that a user may use to adhere the second filter 20 to either the dust chamber 12, as shown in FIG. 3A, or to the primary filter 18, as shown in FIG. 2A. In other embodiments, and as shown in FIG. 3A, the second filter 20 may be held in place during use by flexible tabs 48. In these embodiments, the flexible tabs 48 may be selectively bent to hold the second filter 20 in place during use. Although the flexible tabs 48 are shown located on the primary filter 18 in FIG. 3A, the flexible tabs 18 can be located on the dust chamber 20, as well. In even further embodiments, hook and loop fasteners 50,52, such as Velcro®, may be used to hold the second filter 20 in place during use, as shown in FIG. 2A. In these embodiments, one or more strips of hook or loop fasteners 50,52 may be affixed to the second filter 20. Likewise, corresponding strip(s) of hook or loop fasteners 50,52 are affixed to the primary filter 18 and/or the dust chamber 18. In addition, various combinations of the above methods of removably attaching the second filter 20 to either the primary filter 18 or to the dust chamber 12 are also acceptable. The above methods of removably attaching the second filter 20 in the dust chamber 12 are merely exemplary and any methods known to those of skill in the art may be utilized without departing from the scope of the present invention.

Referring to FIGS. 2A, 4, 4A, 5 and 5A, the second filter 20 removes at least some of the contaminants from the air passing through the entrance 14 of the dust chamber 12. Therefore, the second filter 20 may be made of any suitable filter material that is operable to remove at least some of the contaminants in the air from passing through the entrance 14 of the dust chamber 12 while allowing air to pass therethrough at a desired rate. In effect, the second filter 20 prevents at least some of the contaminants in the air passing through the entrance 14 of the dust chamber 12 from coming into contact with the primary filter 18. In addition, the second filter 20 may be scented or unscented. Commercially available dryer sheet material has been shown to be a particularly useful second filter 20 material. For example, dryer sheets manufactured by Huish Detergents, Inc. of Salt Lake City, Utah and sold under the mark "Cuddle Soft" have been shown to have particular utility. The dryer sheet material is inexpensive, often pleasantly scented, and effective in removing contaminants from the air passing through the entrance 14 of the dust chamber 12. However, any other material that prevents at least some of the contaminants in the air from coming into contact with the primary filter while allowing sufficient airflow would be suitable. In a preferred embodiment, and now referring to FIGS. 4 and 4A, the second filter 20 is comprised multiple dryer sheets that are joined together under heat and pressure. In these embodiments, more than one sheet 54 of the dryer sheet material (e.g., two (2) sheets) are stacked on top of one another and joined together using, for example, a heating means, such as a heating iron. FIGS. 5 and 5A depict an embodiment of the second filter 20 comprising a single dryer sheet.

In operation, the user turns the bagless vacuum 10 on and maneuvers the bagless vacuum 10 over a surface, such as a floor. As the bagless vacuum 10 operates, air is sucked into the bagless vacuum 10 and through the entrance 14 of the dust chamber 12. Typically, the air drawn in by the bagless vacuum 10 contains contaminants, such as dust, dirt and/or debris. After passing through the entrance 14, the air passes through the second filter 20 and the primary filter 18 prior to passing through the exit 16 of the dust chamber 12. The primary filter 18 and second filter 20 remove the contaminants from the air that is drawn in through the entrance 14 of the dust chamber 12. The contaminants that are removed from the air remain in the contaminant storage area 17 of the dust chamber 12. Typically, when the contaminant storage area 17 becomes filled, the user empties the collected contaminants.

During use, contaminants, especially those that are larger in size, typically collect on the second filter 20. Once the second filter 20 becomes increasingly covered, the amount of air that can pass through the second filter 20 decreases. Once covered, the user removes and discards the second filter 20 from the dust chamber 12. In place of the second filter 20 that was removed, a replacement second filter 20 is properly disposed (i.e., removably attached to the primary filter 18 and/or the dust chamber 12) in the dust chamber 20 and operation of the bagless vacuum 12 may continue again.

One major advantage of the present invention is that the primary filter of the bagless vacuum cleaner remains primarily free of lodged debris. Such benefit eliminates the need for washing of the primary filter and, more importantly, drying of the primary filter. Thus, the second filter of the present invention allows essentially continuous use of the bagless vacuum cleaner by reducing the time required to service the bagless vacuum cleaner.

Another advantage of the present invention is that the second filter is easily replaced.

A further advantage of the present invention is that the secondary filter is inexpensive.

It will be obvious to those skilled in the art that various changes may be made without departing from the scope of the present invention and that the invention is not to be considered limited to what is described and exemplified in the specification. For example, although it is preferable to secure the second filter within the dust chamber, the second filter can be placed within the dust chamber without being secured. Additionally, various configurations of the dust chamber and of the second filer are possible. Furthermore, other means of securing the second filter can be used. Moreover, more than two (2) sheets can be placed together to form the second filter 20. Additionally, the bagless vacuum cleaner may include additional filtration systems.

What is claimed is:

1. A bagless vacuum cleaner, comprising:
   a dust chamber having an entrance and an exit;
   a primary filter disposed in the dust chamber such that substantially all air passing through the entrance passes through the primary filter prior to passing through the exit of the dust chamber; and
   a second filter disposed in the dust chamber between the entrance and the primary filter such that substantially all air passing through the entrance passes through the second filter prior to passing through the primary filter;
   wherein the second filter prevents at least some contaminants in the air passing through the entrance from coming into contact with an outer surface of the primary filter and wherein the second filter is directly attached to the primary filter or to the dust chamber; and
   wherein the second filter includes dryer fabric softener sheet material.

2. The bagless vacuum cleaner of claim 1, wherein the second filter is removable.

3. The bagless vacuum cleaner of claim 2, wherein the second filter is removably attached to the primary filter.

4. The bagless vacuum cleaner of claim 2, wherein the primary filter includes flexible tabs or any other means of securing that are operable to removably attach the second filter to the primary filter.

5. The bagless vacuum cleaner of claim 2, wherein the second filter includes flexible tabs that are operable to removably attach the second filter to the primary filter.

6. The bagless vacuum cleaner of claim 2, wherein the second filter is removably attached to the primary filter using at least one hook and loop fastener.

7. The bagless vacuum cleaner of claim 2, wherein the second filter includes an adhesive for removably attaching the second filter to the primary filter.

8. The bagless vacuum cleaner of claim 2, wherein the primary filter includes an adhesive for removably attaching the second filter to the primary filter.

9. The bagless vacuum cleaner of claim 1, wherein the second filter is removably attached to the dust chamber.

10. The bagless vacuum cleaner of claim 9, wherein the second filter includes an adhesive for removably attaching the second filter to the dust chamber.

11. The bagless vacuum cleaner of claim 9, wherein the dust chamber includes flexible tabs that are operable to removably attach the second filter to the primary filter.

12. The bagless vacuum cleaner of claim 1, further comprising means for securing the second filter within the dust chamber.

13. The bagless vacuum cleaner of claim 12, wherein the means for securing the second filter within the dust chamber is disposed on the primary filter.

14. The bagless vacuum cleaner of claim 12, wherein the means for securing the second filter within the dust chamber is disposed on the second filter.

15. The bagless vacuum cleaner of claim 12, wherein the means for securing the second filter within the dust chamber is disposed on the dust chamber.

16. The bagless vacuum cleaner of claim 1, wherein the second filter includes multiple dryer sheets.

17. The bagless vacuum cleaner of claim 16, wherein the multiple dryer sheets are joined together with heat and pressure prior to disposing the second filter in the dust chamber.

18. A method for using a bagless vacuum cleaner that utilizes a primary filter disposed in a dust chamber between an entrance and an exit to the dust chamber such that substantially all air passing through the entrance passes through the primary filter prior to passing through the exit, the method comprising the steps of:
   providing a disposable second filter of the main filtration system; and
   placing the second filter in the dust chamber between the entrance to the dust chamber and the first filter such that substantially all air passing through the entrance passes through the second filter prior to passing through the primary filter such that the second filter is operable to prevent at least some contaminants, when present, in the air passing through the entrance from coming into contact with an outer surface of the primary filter; and
   disposing of the second filter once the second filter is at least partially covered with the contaminants from the air passing through the entrance;
   wherein the second filter includes dryer fabric softener sheet material.

19. The method of claim 18, wherein the second filter is disposed in dust chamber such that the second filter is removably attached to the primary filter.

20. The method for using a second filter in a bagless vacuum of claim 18, wherein the second filter is removably attached to the dust chamber.

21. The method for using a second filter in a bagless vacuum of claim 18, wherein the second filter includes more than one dryer sheet.

22. A second filter for use in a bagless vacuum cleaner, comprising:
   a second filter body for disposing within a dust chamber of the bagless vacuum cleaner such that the second filter body is disposed in the dust chamber between an entrance and a primary filter;
   wherein substantially all air passing through the entrance passes through the second filter body prior to passing through the primary filter, the second filter preventing at least some of the contaminants in the air passing therethrough from lodging in the primary filter and wherein the second filter body is able to conform to the shape of the primary filter during operation of the bagless vacuum cleaner;
   wherein the second filter body includes dryer fabric softener sheet material.

23. The second filter for use in a bagless vacuum cleaner of claim 22 wherein the second filter includes an adhesive strip for securing the second filter body within the dust chamber.

24. The second filter for use in a bagless vacuum cleaner of claim 22 wherein the second filter includes a hook and loop fastener for securing the second filter body within the dust chamber.

25. The second filter for use in a bagless vacuum cleaner of claim 22 wherein the second filter includes a hook and loop fastener for securing the second filter body within the dust chamber.

26. A second filter for use in a bagless vacuum cleaner, comprising:
   at least one sheet of filter material disposed within a dust chamber of the bagless vacuum cleaner such that the filter material is disposed in the dust chamber between an entrance and a primary filter; and
   wherein substantially all air passing through the entrance passes through the filtering material prior to passing through the primary filter, the filter material preventing at least some of the contaminants in the air passing therethrough from lodging in the primary filter and wherein the filter material includes dryer fabric softener sheet material.

27. The second filter according to claim 26 wherein at least one sheet of the filter material is removable and replaceable.

28. The second filter according to claim 26 wherein the filter material is a single dryer sheet.

29. The second filter according to claim 26 wherein the filter material is comprised of multiple dryer sheets.

30. The second filter according to claim 29 wherein the multiple dryer sheets are joined together using a heating means.

31. The second filter according to claim 26 wherein the filtering material includes means for securing the filter material within the dust chamber.

* * * * *